United States Patent
Paraschiv et al.

(10) Patent No.: US 11,138,232 B1
(45) Date of Patent: Oct. 5, 2021

(54) EXPORT DATA FROM TABLES INTO PARTITIONED FOLDERS ON AN EXTERNAL DATA LAKE

(71) Applicant: Snowflake Inc., Bozeman, MT (US)

(72) Inventors: Vasile Paraschiv, Redmond, WA (US); Saurin Shah, Kirkland, WA (US); Marianne Shaw, Bothell, WA (US); Nileema Shingte, San Mateo, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 17/086,215

(22) Filed: Oct. 30, 2020

Related U.S. Application Data

(60) Provisional application No. 63/092,347, filed on Oct. 15, 2020.

(51) Int. Cl.
  *G06F 16/27* (2019.01)
  *G06F 16/28* (2019.01)
  *G06F 9/30* (2018.01)
  *G06F 16/22* (2019.01)
  *G06F 16/2455* (2019.01)

(52) U.S. Cl.
  CPC .......... *G06F 16/278* (2019.01); *G06F 9/3009* (2013.01); *G06F 16/2282* (2019.01); *G06F 16/24554* (2019.01); *G06F 16/283* (2019.01)

(58) Field of Classification Search
  USPC .......................................... 703/803; 707/803
  See application file for complete search history.

(56) References Cited

U.S. PATENT DOCUMENTS

| | | | |
|---|---|---|---|
| 7,035,851 B1* | 4/2006 | Sinclair | G06F 16/2282 |
| 9,177,025 B2 | 11/2015 | Bensberg et al. | |
| 9,697,217 B1 | 7/2017 | Salyers et al. | |
| 10,467,105 B2 | 11/2019 | Theimer et al. | |
| 10,754,877 B2 | 8/2020 | Kassko et al. | |
| 2006/0218123 A1* | 9/2006 | Chowdhuri | G06F 16/24532 |
| 2012/0197995 A1* | 8/2012 | Caruso | G06F 16/137 709/204 |
| 2013/0151492 A1* | 6/2013 | Kirihata | G06F 16/134 707/696 |
| 2015/0293980 A1 | 10/2015 | Dola | |

(Continued)

OTHER PUBLICATIONS

"U.S. Appl. No. 17/086,221, Non Final Office Action dated Jan. 28, 2021", 35 pgs.

(Continued)

*Primary Examiner* — Muluemebet Gurmu
(74) *Attorney, Agent, or Firm* — Schwegman Lundberg & Woessner, P.A.

(57) ABSTRACT

A database export system exports data using a plurality of nodes that process the data to generate structured result files that are partitioned by an export parameter in an export request. The database export system distributes the data and merges the files to avoid small file creation and increase processing speed via parallelism. The database export system generates the result files of a specified maximum size in a final format, where the files are processed merged in a temporary file format. The parallel processing is optimized and constrained per the amount of processing nodes, available memory, requested final file sizes, and operation based ordering to complete data exports in a scalable multi-stage approach.

18 Claims, 8 Drawing Sheets

(56) References Cited

U.S. PATENT DOCUMENTS

| | | |
|---|---|---|
| 2015/0370816 A1* | 12/2015 | Anand .................... G06F 3/067 |
| | | 707/782 |
| 2016/0034205 A1 | 2/2016 | Mehra et al. |
| 2016/0147748 A1 | 5/2016 | Florendo et al. |
| 2016/0350301 A1 | 12/2016 | Tripathy et al. |
| 2017/0228290 A1* | 8/2017 | Maccanti ............ G06F 11/1469 |
| 2017/0371926 A1 | 12/2017 | Shiran et al. |
| 2018/0107514 A1 | 4/2018 | Dice et al. |
| 2020/0008971 A1 | 3/2020 | Higgins et al. |
| 2020/0117637 A1* | 4/2020 | Roy ..................... G06F 16/137 |
| 2020/0334269 A1 | 10/2020 | Chowdhury et al. |

OTHER PUBLICATIONS

"U.S. Appl. No. 17/086,221, Final Office Action dated May 19, 2021", 39 pgs.

"U.S. Appl. No. 17/086,221, Response filed Apr. 28, 2021 to Non Final Office Action dated Jan. 28, 2021", 16 pgs.

\* cited by examiner

EXPORT DATA FROM TABLES INTO PARTITIONED FOLDERS ON AN EXTERNAL DATA LAKE

CROSS-REFERENCE TO RELATED APPLICATION

This application claims the benefit of priority to U.S. Provisional Patent Application Ser. No. 63/092,347, filed on Oct. 15, 2020, the contents of which are incorporated herein in their entirety.

TECHNICAL FIELD

The present disclosure generally relates to special-purpose machines that manage database data and improvements to such variants, and to the technologies by which such special-purpose machines become improved compared to other special-purpose machines for transmitting database data between databases connected by a network.

BACKGROUND

Databases are used for data storage and access in computing applications. A goal of database storage is to provide enormous sums of information in an organized manner so that it can be accessed, managed, and updated. In a database, data may be organized into rows, columns, and tables. Database data can be exported to a remote location (e.g., external data lake) using a copy or export command. The data can be exported to a single location and additional tools can then be used to further partition the data into different folders at the remote location. The process of further partitioning the data into the different folders creates unwanted time and computational overhead.

BRIEF DESCRIPTION OF THE DRAWINGS

Various ones of the appended drawings merely illustrate example embodiments of the present disclosure and should not be considered as limiting its scope.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As discussed, exporting data to a remote location in a structured format (e.g., multiple folders/partitions) can create unwanted overhead. To this end, a multi-stage database partition unloader can export data to a remote datastore such as a data lake, using a single database copy command that uses a partition expression (e.g., "partition by") to parallelize processing of the files into a plurality of result files at the remote location using a plurality of nodes in the database in a distributed and scalable approach.

Figure 1:
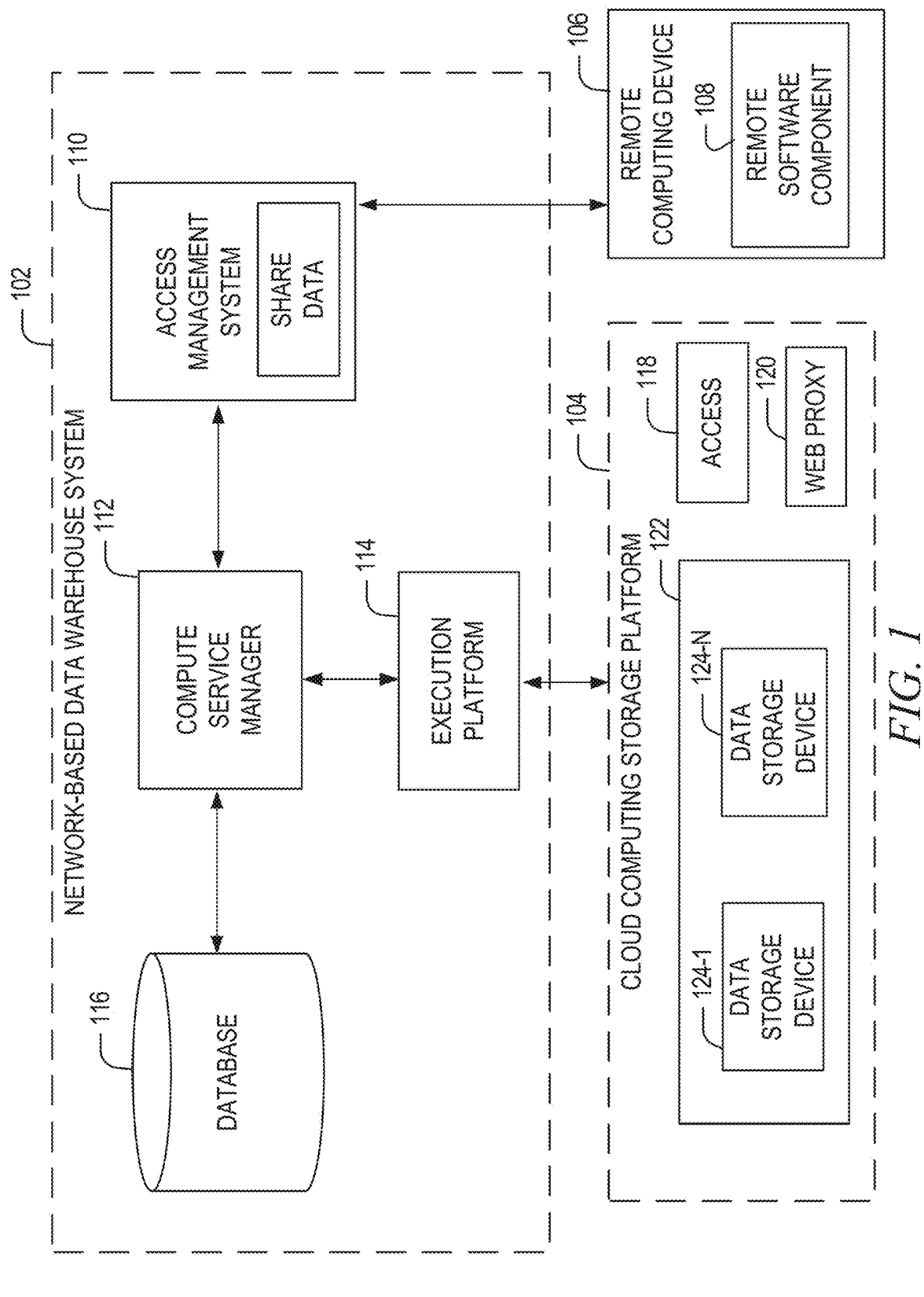
FIG. 1 is a block diagram illustrating an example computing environment in which a network-based data warehouse system can implement multi-stage export, according to some example embodiments.

FIG. 1 illustrates an example shared data processing platform 100 in which a network-based data warehouse system 102 implements database stream tracking (e.g., view streams), in accordance with some embodiments of the present disclosure. To avoid obscuring the inventive subject matter with unnecessary detail, various functional components that are not germane to conveying an understanding of the inventive subject matter have been omitted from the figures. However, a skilled artisan will readily recognize that various additional functional components may be included as part of the shared data processing platform 100 to facilitate additional functionality that is not specifically described herein.

As shown, the shared data processing platform 100 comprises the network-based data warehouse system 102, a cloud computing storage platform 104 (e.g., a storage platform, an AWS® service such as S3, Microsoft Azure®, or Google Cloud Services®), and a remote computing device 106. The network-based data warehouse system 102 is a network-based system used for storing and accessing data (e.g., internally storing data, accessing external remotely located data) in an integrated manner, and reporting and analysis of the integrated data from the one or more disparate sources (e.g., the cloud computing storage platform 104). The cloud computing storage platform 104 comprises a plurality of computing machines and provides on-demand computer system resources such as data storage and computing power to the network-based data warehouse system 102.

The remote computing device 106 (e.g., a user device such as a laptop computer) comprises one or more computing machines (e.g., a user device such as a laptop computer) that execute a remote software component 108 (e.g., browser accessed cloud service) to provide additional functionality to users of the network-based data warehouse system 102. The remote software component 108 comprises a set of machine-readable instructions (e.g., code) that, when executed by the remote computing device 106, cause the remote computing device 106 to provide certain functionality. The remote software component 108 may operate on input data and generates result data based on processing, analyzing, or otherwise transforming the input data. As an example, the remote software component 108 can be a data provider or data consumer that enables database tracking procedures, such as streams on shared tables and views, as discussed in further detail below.

The network-based data warehouse system 102 comprises an access management system 110, a compute service manager 112, an execution platform 114, and a database 116. The access management system 110 enables administrative users to manage access to resources and services provided by the network-based data warehouse system 102. Administrative users can create and manage users, roles, and groups, and use permissions to allow or deny access to resources and services. The access management system 110 can store shared data that securely manages shared access to the storage resources of the cloud computing storage platform 104 amongst different users of the network-based data warehouse system 102, as discussed in further detail below.

The compute service manager 112 coordinates and manages operations of the network-based data warehouse system 102. The compute service manager 112 also performs query optimization and compilation as well as managing clusters of computing services that provide compute resources (e.g., virtual warehouses, virtual machines, EC2 clusters). The compute service manager 112 can support any number of client accounts such as end users providing data storage and retrieval requests, system administrators managing the systems and methods described herein, and other components/devices that interact with compute service manager 112.

The compute service manager 112 is also coupled to database 116, which is associated with the entirety of data stored on the shared data processing platform 100. The database 116 stores data pertaining to various functions and aspects associated with the network-based data warehouse system 102 and its users. For example, data to be tracked via streams can be stored and accessed on the cloud computing storage platform 104 (e.g., on S3) or stored and accessed on the database 116 that is local to the network-based data warehouse system 102, according to some example embodiments.

In some embodiments, database 116 includes a summary of data stored in remote data storage systems as well as data available from one or more local caches. Additionally, database 116 may include information regarding how data is organized in the remote data storage systems and the local caches. Database 116 allows systems and services to determine whether a piece of data needs to be accessed without loading or accessing the actual data from a storage device. The compute service manager 112 is further coupled to an execution platform 114, which provides multiple computing resources (e.g., virtual warehouses) that execute various data storage and data retrieval tasks, as discussed in greater detail below. In some example embodiments, the database 116 includes a staging area for temporary files to be merged (e.g., arrow files) that are generated by the plurality of nodes.

Execution platform 114 is coupled to multiple data storage devices 124-1 to 124-n that are part of a cloud computing storage platform 104. In some embodiments, data storage devices 124-1 to 124-n are cloud-based storage devices located in one or more geographic locations. For example, data storage devices 124-1 to 124-n may be part of a public cloud infrastructure or a private cloud infrastructure. Data storage devices 124-1 to 124-n may be hard disk drives (HDDs), solid state drives (SSDs), storage clusters, network storage systems or any other data storage technology (e.g., Amazon S3, Google Cloud Services, Azure Data Lake, etc.). Additionally, cloud computing storage platform 104 may include distributed file systems (such as Hadoop Distributed File Systems (HDFS)), object storage systems, and the like.

The execution platform 114 comprises a plurality of compute nodes (e.g., virtual warehouses). A set of processes on a compute node executes a query plan compiled by the compute service manager 112. The set of processes can include: a first process to execute the query plan; a second process to monitor and delete micro-partition files using a least recently used (LRU) policy, and implement an out of memory (OOM) error mitigation process; a third process that extracts health information from process logs and status information to send back to the compute service manager 112; a fourth process to establish communication with the compute service manager 112 after a system boot; and a fifth process to handle all communication with a compute cluster for a given job provided by the compute service manager 112 and to communicate information back to the compute service manager 112 and other compute nodes of the execution platform 114.

The cloud computing storage platform 104 also comprises an access management system 118 and a web proxy 120. As with the access management system 110, the access management system 118 allows users to create and manage users, roles, and groups, and use permissions to allow or deny access to cloud services and resources. The access management system 110 of the network-based data warehouse system 102 and the access management system 118 of the cloud computing storage platform 104 can communicate and share information so as to enable access and management of resources and services shared by users of both the network-based data warehouse system 102 and the cloud computing storage platform 104. The web proxy 120 handles tasks involved in accepting and processing concurrent API calls, including traffic management, authorization and access control, monitoring, and API version management. The web proxy 120 provides HTTP proxy service for creating, publishing, maintaining, securing, and monitoring APIs (e.g., REST APIs).

In some embodiments, communication links between elements of the shared data processing platform 100 are implemented via one or more data communication networks. These data communication networks may utilize any communication protocol and any type of communication medium. In some embodiments, the data communication networks are a combination of two or more data communication networks (or sub-networks) coupled to one another. In alternative embodiments, these communication links are implemented using any type of communication medium and any communication protocol.

As shown in FIG. 1, data storage devices 124-1 to 124-N are decoupled from the computing resources associated with the execution platform 114. That is, new virtual warehouses can be created and terminated in the execution platform 114 and additional data storage devices can be created and terminated on the cloud computing storage platform 104 in an independent manner. This architecture supports dynamic changes to the network-based data warehouse system 102 based on the changing data storage/retrieval needs as well as the changing needs of the users and systems accessing the shared data processing platform 100. The support of dynamic changes allows network-based data warehouse system 102 to scale quickly in response to changing demands on the systems and components within network-based data warehouse system 102. The decoupling of the computing resources from the data storage devices 124 supports the storage of large amounts of data without requiring a corresponding large amount of computing resources. Similarly, this decoupling of resources supports a significant increase in the computing resources utilized at a particular time without requiring a corresponding increase in the available data storage resources. Additionally, the decoupling of resources enables different accounts to handle creating additional compute resources to process data shared by other users without affecting the other users' systems. For instance, a data provider may have three compute resources and share data with a data consumer, and the data consumer may generate new compute resources to execute queries against the shared data, where the new compute resources are managed by the data consumer and do not affect or interact with the compute resources of the data provider.

Compute service manager 112, database 116, execution platform 114, cloud computing storage platform 104, and remote computing device 106 are shown in FIG. 1 as individual components. However, each of compute service manager 112, database 116, execution platform 114, cloud computing storage platform 104, and remote computing device 106 may be implemented as a distributed system (e.g., distributed across multiple systems/platforms at multiple geographic locations) connected by APIs and access information (e.g., tokens, login data). Additionally, each of compute service manager 112, database 116, execution platform 114, and cloud computing storage platform 104 can be scaled up or down (independently of one another) depending on changes to the requests received and the changing needs of shared data processing platform 100. Thus, in the described embodiments, the network-based data warehouse system 102 is dynamic and supports regular changes to meet the current data processing needs.

During typical operation, the network-based data warehouse system 102 processes multiple jobs (e.g., queries) determined by the compute service manager 112. These jobs are scheduled and managed by the compute service manager 112 to determine when and how to execute the job. For example, the compute service manager 112 may divide the job into multiple discrete tasks and may determine what data is needed to execute each of the multiple discrete tasks. The compute service manager 112 may assign each of the multiple discrete tasks to one or more nodes of the execution platform 114 to process the task. The compute service manager 112 may determine what data is needed to process a task and further determine which nodes within the execution platform 114 are best suited to process the task. Some nodes may have already cached the data needed to process the task (due to the nodes having recently downloaded the data from the cloud computing storage platform 104 for a previous job) and, therefore, may be a good candidate for processing the task. Metadata stored in the database 116 assists the compute service manager 112 in determining which nodes in the execution platform 114 have already cached at least a portion of the data needed to process the task. One or more nodes in the execution platform 114 process the task using data cached by the nodes and data retrieved from the cloud computing storage platform 104. It is desirable to retrieve as much data as possible from caches within the execution platform 114 because the retrieval speed is typically much faster than retrieving data from the cloud computing storage platform 104.

As shown in FIG. 1, the shared data processing platform 100 separates the execution platform 114 from the cloud computing storage platform 104. In this arrangement, the processing resources and cache resources in the execution platform 114 operate independently of the data storage devices 124-1 to 124-n in the cloud computing storage platform 104. Thus, the computing resources and cache resources are not restricted to specific data storage devices 124-1 to 124-n. Instead, all computing resources and all cache resources may retrieve data from, and store data to, any of the data storage resources in the cloud computing storage platform 104.

Figure 2:
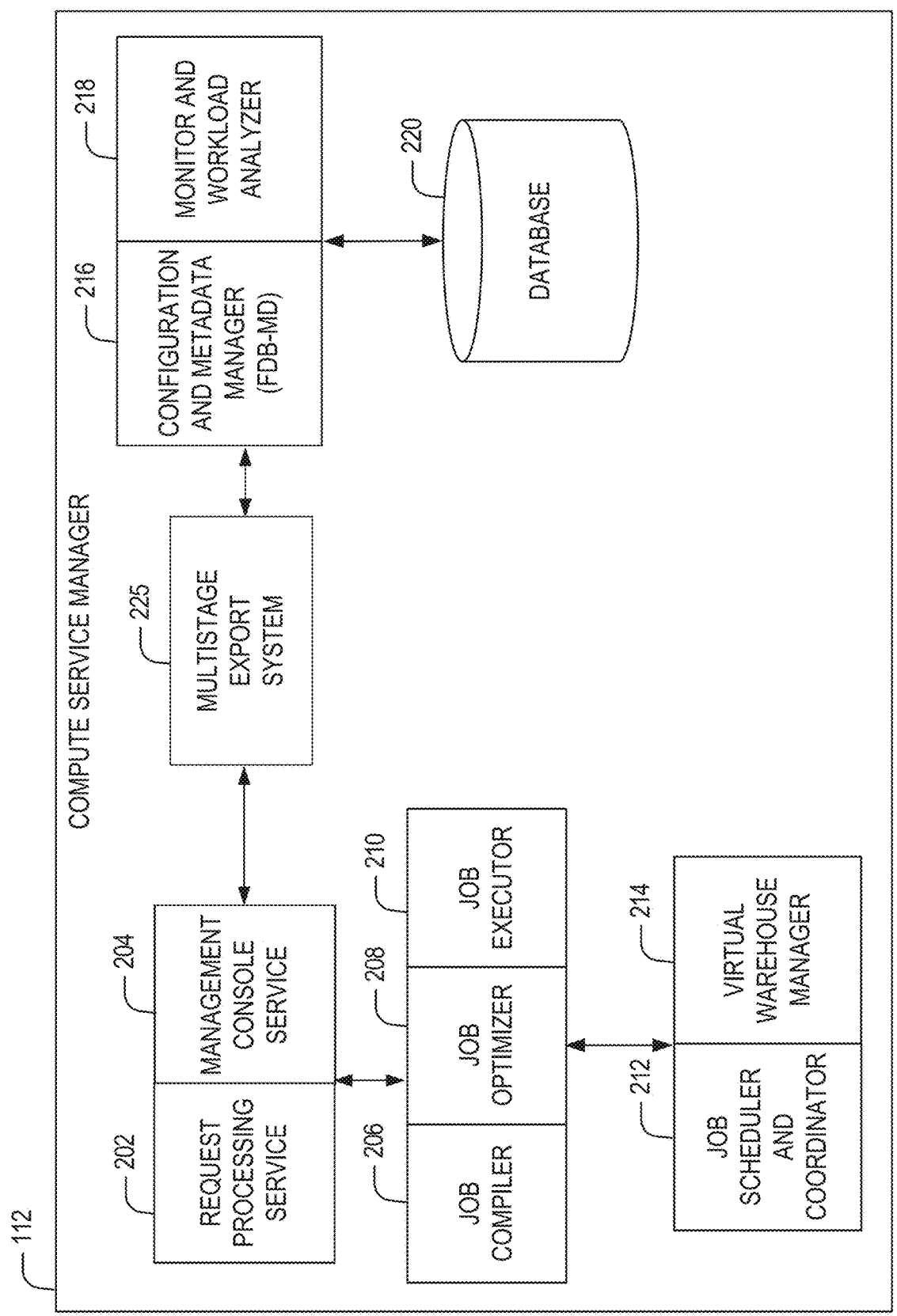
FIG. 2 is a block diagram illustrating components of a compute service manager, according to some example embodiments.

FIG. 2 is a block diagram illustrating components of the compute service manager 112, in accordance with some embodiments of the present disclosure. As shown in FIG. 2, a request processing service 202 manages received data storage requests and data retrieval requests (e.g., jobs to be performed on database data). For example, the request processing service 202 may determine the data to process a received query (e.g., a data storage request or data retrieval request). The data may be stored in a cache within the execution platform 114 or in a data storage device in cloud computing storage platform 104. A management console service 204 supports access to various systems and processes by administrators and other system managers. Additionally, the management console service 204 may receive a request to execute a job and monitor the workload on the system. The multistage export system 225 manages transmission of database data, such as exporting data to an external data store (e.g., data lake) in a multi-stage approach, as discussed in further detail below.

The compute service manager 112 also includes a job compiler 206, a job optimizer 208, and a job executor 210. The job compiler 206 parses a job into multiple discrete tasks and generates the execution code for each of the multiple discrete tasks. The job optimizer 208 determines the best method to execute the multiple discrete tasks based on the data that needs to be processed. The job optimizer 208 also handles various data pruning operations and other data optimization techniques to improve the speed and efficiency of executing the job. The job executor 210 executes the execution code for jobs received from a queue or determined by the compute service manager 112.

A job scheduler and coordinator 212 sends received jobs to the appropriate services or systems for compilation, optimization, and dispatch to the execution platform 114. For example, jobs may be prioritized and processed in that prioritized order. In an embodiment, the job scheduler and coordinator 212 determines a priority for internal jobs that are scheduled by the compute service manager 112 with other "outside" jobs such as user queries that may be scheduled by other systems in the database but may utilize the same processing resources in the execution platform 114. In some embodiments, the job scheduler and coordinator 212 identifies or assigns particular nodes in the execution platform 114 to process particular tasks. A virtual warehouse manager 214 manages the operation of multiple virtual warehouses implemented in the execution platform 114. As discussed below, each virtual warehouse includes multiple execution nodes that each include a cache and a processor (e.g., a virtual machine, an operating system level container execution environment).

Additionally, the compute service manager 112 includes a configuration and metadata manager 216, which manages the information related to the data stored in the remote data storage devices and in the local caches (i.e., the caches in execution platform 114). The configuration and metadata manager 216 uses the metadata to determine which data micro-partitions need to be accessed to retrieve data for processing a particular task or job. A monitor and workload analyzer 218 oversees processes performed by the compute service manager 112 and manages the distribution of tasks (e.g., workload) across the virtual warehouses and execution nodes in the execution platform 114. The monitor and workload analyzer 218 also redistributes tasks, as needed, based on changing workloads throughout the network-based data warehouse system 102 and may further redistribute tasks based on a user (e.g., "external") query workload that may also be processed by the execution platform 114. The configuration and metadata manager 216 and the monitor and workload analyzer 218 are coupled to a data storage device 220. The data storage device 220 in FIG. 2 represents any data storage device within the network-based data warehouse system 102. For example, data storage device 220 may represent caches in execution platform 114, storage devices in cloud computing storage platform 104, or any other storage device.

Figure 3:
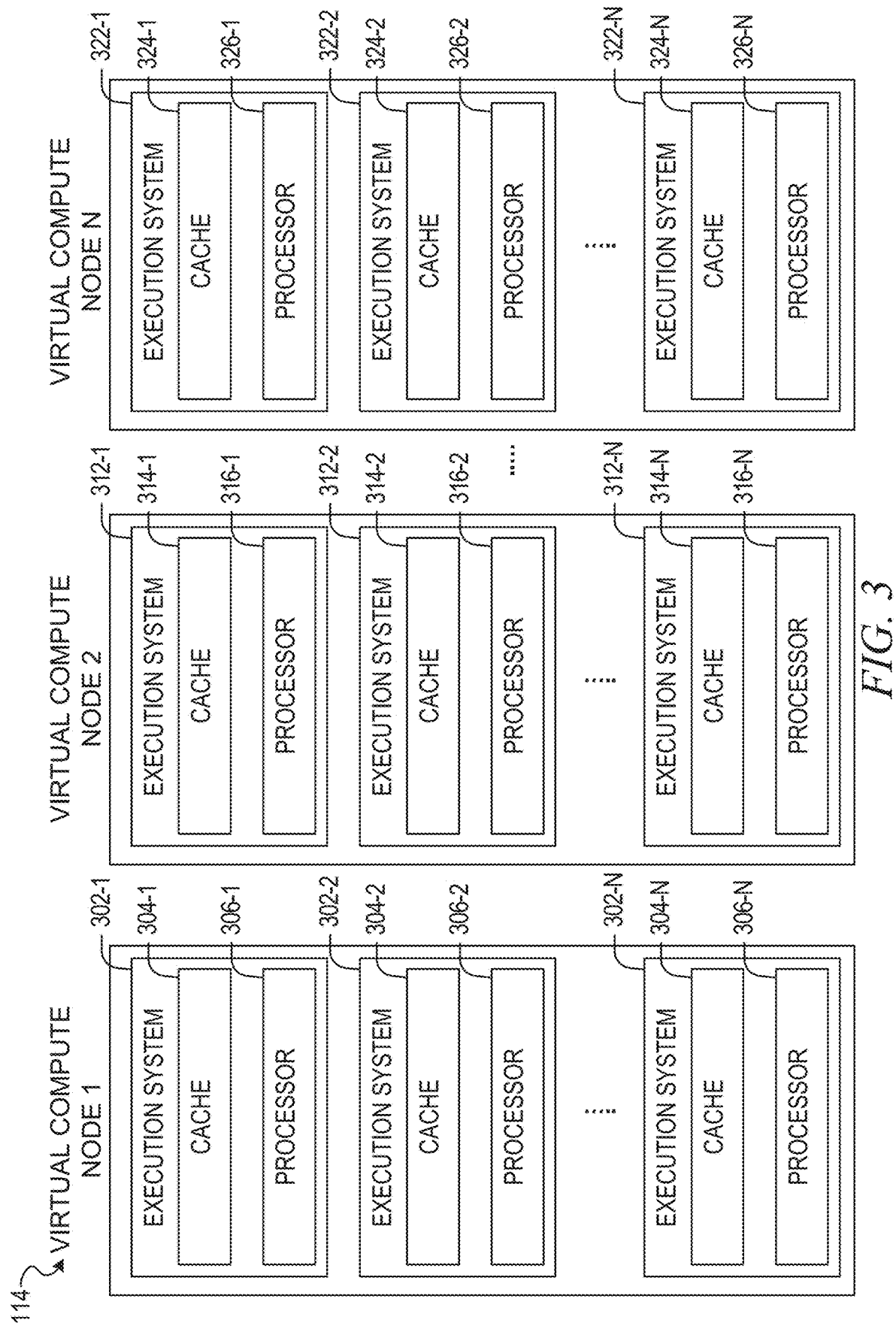
FIG. 3 is a block diagram illustrating components of an execution platform, according to some example embodiments.

FIG. 3 is a block diagram illustrating components of the execution platform 114, in accordance with some embodiments of the present disclosure. As shown in FIG. 3, execution platform 114 includes multiple virtual warehouses, which are elastic clusters of compute instances, such as virtual machines. In the example illustrated, the virtual warehouses include virtual compute node 1, virtual compute node 2, and virtual warehouse n. Each virtual warehouse (e.g., EC2 cluster) includes multiple execution nodes (e.g., virtual machines) that each include a data cache and a processor. The virtual warehouses can execute multiple tasks in parallel by using the multiple execution nodes. As discussed herein, execution platform 114 can add new virtual warehouses and drop existing virtual warehouses in real time based on the current processing needs of the systems and users. This flexibility allows the execution platform 114 to quickly deploy large amounts of computing resources when needed without being forced to continue paying for those computing resources when they are no longer needed. All virtual warehouses can access data from any data storage device (e.g., any storage device in cloud computing storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary (e.g., upon a query or job completion).

Each virtual warehouse is capable of accessing any of the data storage devices 124-1 to 124-n shown in FIG. 1. Thus, the virtual warehouses are not necessarily assigned to a specific data storage device 124-1 to 124-n and, instead, can access data from any of the data storage devices 124-1 to 124-n within the cloud computing storage platform 104. Similarly, each of the execution nodes shown in FIG. 3 can access data from any of the data storage devices 124-1 to 124-n. For instance, the storage device 124-1 of a first user (e.g., provider account user) may be shared with a worker node in a virtual warehouse of another user (e.g., consumer account user), such that the other user can create a database (e.g., read-only database) and use the data in storage device 124-1 directly without needing to copy the data (e.g., copy it to a new disk managed by the consumer account user). In some embodiments, a particular virtual warehouse or a particular execution node may be temporarily assigned to a specific data storage device, but the virtual warehouse or execution node may later access data from any other data storage device.

In the example of FIG. 3, virtual compute node 1 includes three execution nodes 302-1, 302-2, and 302-n. Execution node 302-1 includes a cache 304-1 and a processor 306-1. Execution node 302-2 includes a cache 304-2 and a processor 306-2. Execution node 302-n includes a cache 304-n and a processor 306-n. Each execution node 302-1, 302-2, and 302-n is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual compute node 1 discussed above, virtual compute node 2 includes three execution nodes 312-1, 312-2, and 312-n. Execution node 312-1 includes a cache 314-1 and a processor 316-1. Execution node 312-2 includes a cache 314-2 and a processor 316-2. Execution node 312-n includes a cache 314-n and a processor 316-n. Additionally, virtual warehouse 3 includes three execution nodes 322-1, 322-2, and 322-n. Execution node 322-1 includes a cache 324-1 and a processor 326-1. Execution node 322-2 includes a cache 324-2 and a processor 326-2. Execution node 322-n includes a cache 324-n and a processor 326-n.

In some embodiments, the execution nodes shown in FIG. 3 are stateless with respect to the data the execution nodes are caching. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternate embodiments may include execution nodes containing any number of processors and any number of caches. Additionally, the caches may vary in size among the different execution nodes. The caches shown in FIG. 3 store, in the local execution node (e.g., local disk), data that was retrieved from one or more data storage devices in cloud computing storage platform 104 (e.g., S3 objects recently accessed by the given node). In some example embodiments, the cache stores file headers and individual columns of files as a query downloads only columns useful for that query.

To improve cache hits and avoid overlapping redundant data stored in the node caches, the job optimizer 208 assigns input file sets to the nodes using a consistent hashing scheme to hash over table file names of the data accessed (e.g., data in database 116 or database 122). Subsequent or concurrent queries accessing the same table file will therefore be performed on the same node, according to some example embodiments.

As discussed, the nodes and virtual warehouses may change dynamically in response to environmental conditions (e.g., disaster scenarios), hardware/software issues (e.g., malfunctions), or administrative changes (e.g., changing from a large cluster to smaller cluster to lower costs). In some example embodiments, when the set of nodes changes, no data is reshuffled immediately. Instead, the least recently used replacement policy is implemented to eventually replace the lost cache contents over multiple jobs. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud computing storage platform 104.

Further, the cache resources and computing resources may vary between different execution nodes. For example, one execution node may contain significant computing resources and minimal cache resources, making the execution node useful for tasks that make use of significant computing resources. Another execution node may contain significant cache resources and minimal computing resources, making this execution node useful for tasks that may use caching of large amounts of data. Yet another execution node may contain cache resources providing faster input-output operations, useful for tasks that make use of fast scanning of large amounts of data. In some embodiments, the execution platform 114 implements skew handling to distribute work amongst the cache resources and computing resources associated with a particular execution, where the distribution may be further based on the expected tasks to be performed by the execution nodes. For example, an execution node may be assigned more processing resources if the tasks performed by the execution node become more processor-intensive. Similarly, an execution node may be assigned more cache resources if the tasks performed by the execution node may use a larger cache capacity. Further, some nodes may be executing much slower than others due to various issues (e.g., virtualization issues, network overhead). In some example embodiments, the imbalances are addressed at the scan level using a file stealing scheme. In particular, whenever a node process completes scanning its set of input files, it requests additional files from other nodes. If the one of the other nodes receives such a request, the node analyzes its own set (e.g., how many files are left in the input file set when the request is received), and then transfers ownership of one or more of the remaining files for the duration of the current job (e.g., query). The requesting node (e.g., the file stealing node) then receives the data (e.g., header data) and downloads the files from the cloud computing storage platform 104 (e.g., from data storage device 124-1), and does not download the files from the transferring node. In this way, lagging nodes can transfer files via file stealing in a way that does not worsen the load on the lagging nodes.

Although virtual warehouses 1, 2, and n are associated with the same execution platform 114, the virtual warehouses may be implemented using multiple computing systems at multiple geographic locations. For example, virtual compute node 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual compute node 1 implements execution nodes 302-1 and 302-2 on one computing platform at a geographic location and implements execution node 302-n at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 114 is also fault tolerant. For example, if one virtual warehouse fails, that virtual warehouse is quickly replaced with a different virtual warehouse at a different geographic location.

A particular execution platform 114 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud computing storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
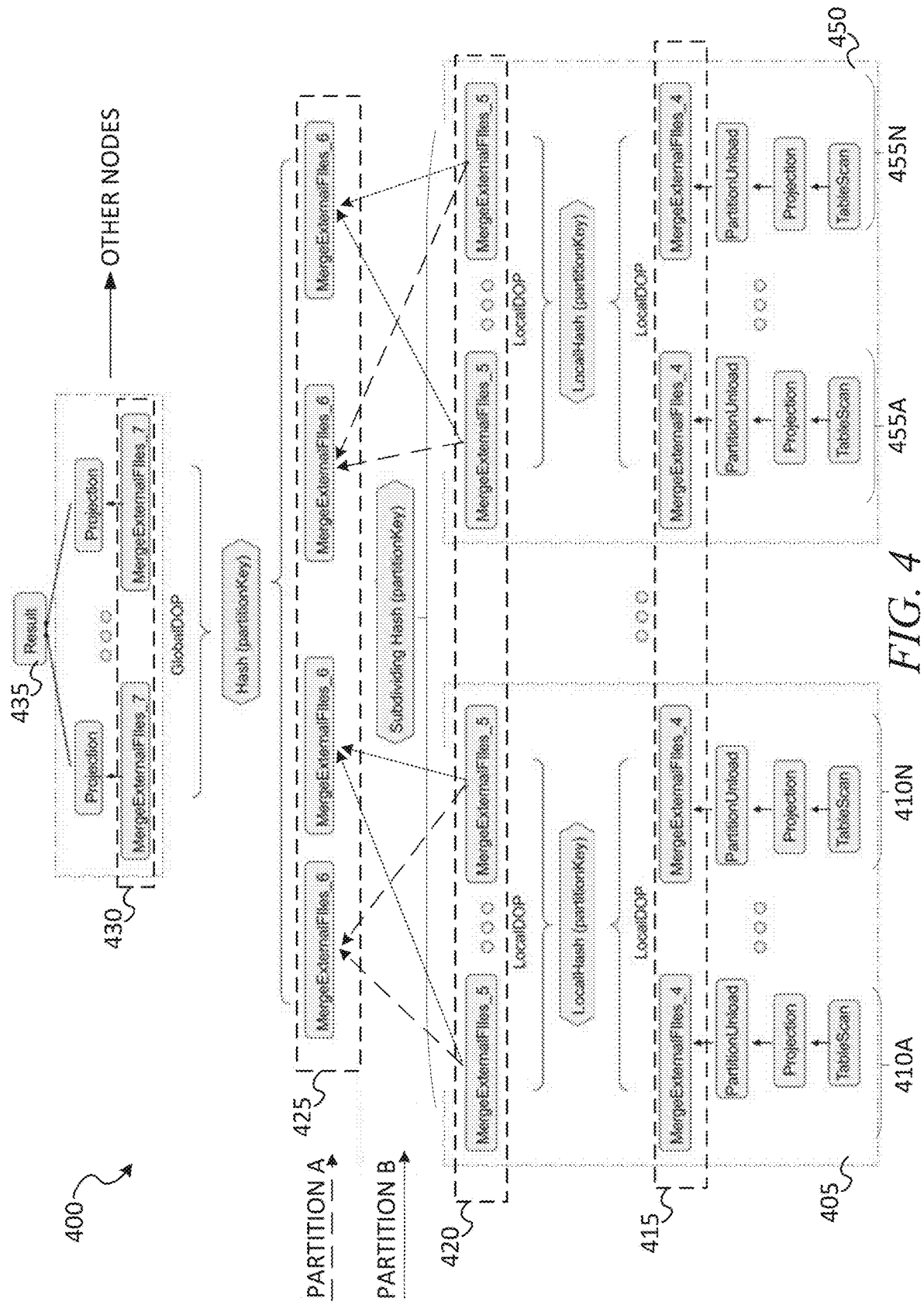
FIG. 4 is a multistage export database architecture, according to some example embodiments.

FIG. 4 shows a multi-stage database partition unloader architecture 400, according to some example embodiments. In the example, a database user using remote computing device 106 issues a single copy unload command to the database 116 to export data to an external data store (e.g., external data lake), where the copy unload command includes a partition-by parameter that specifies how the data should be processed (e.g., exported, merged, and distributed) to efficiently export the data to different partitions in the data lake.

As an example, if the data managed by the database are website events (e.g., click-stream logs) of users hitting the website(s) with each recorded by timestamp, the user may seek to export the data to an external datastore as files, but not in a single folder. Rather, the user seeks to partition them by time, so that the user can analyze the data in a structured approach (e.g., the user request, from the files, all click-stream logs of users that visited a certain month, or set of months in a given year, etc.). As another example, a user can seek to export data to different partitions in the external datastore, where the partitions are organized by state information, country information, zip code information, thereby enabling the user to only look for data about a given zip-code by navigating to the correct folder, instead of scanning all the data in a single folder.

Conventionally, if the user wants to export data into 2,000 folders (e.g., timestamp based partitions, etc.) in the external data lake the user can issue 2,000 copy unload commands, where each one specifies one of folders into which a portion of the data is unloaded, however this type of approach is not efficient. Alternatively, in another conventional approach, the user can export the data into a single folder in the external data store and then use an external tool (e.g., Apache Spark) to separate the data after export, however the external tools can require additional time and resources to configure, which is not preferable for users.

One issue encountered by distributing the data to nodes for processing is the generation of small files, which can skew the processing and overload certain nodes while other nodes may not have any data to process (due to quickly processing the small amount of data to which the node is assigned). Further, if the generated export files are small, then later downstream applications will incur a loss of performance in handling the small files. At a high level, architecture 400 solves these export and small file skew issues by distributing the files to each node, processing them using a lower projection operation into a first temporary format which can be easily serialized and deserialized (e.g., Arrow file format), storing the temporary files locally for hashing and redistribution to then nodes, and then generating result files using an upper projection according to the user's request in a second final format, a non-Arrow format, such as Parquet, of a given size (e.g., 500 MB), thereby cleaning up the small files and avoiding downstream small file performance issues.

With reference to FIG. 4, two worker nodes 405 and 450 are illustrated (e.g., node 302-1, node 302-2, FIG. 4), each having a plurality of threads 410A-410N and 455A-455N. Each of the nodes performs a table scan, a projection per the export (e.g., lower projection to retrieve relevant data per the export request), and performs a partition unload operation to generate merge files 415. The merge files 415 are then locally hashed by the partition key from the export request to merge the files according to their destination partition (e.g., certain month, if the export command's partition request is timestamp based), which generates merge files 420. The merge files 420 can then be stored by each of the workers to an internal staging area that is internal to the database, thereby avoiding egress charges and increasing access and later processing operations. The merge files 420 then undergo subdividing hashing by the partition key to generate merge files 425, which funnels the files by a given partition towards other files that belong in the same given partition. As illustrated by the dashed line for partition A and the dotted lines for partition B, the subdivide hash further merges and consolidates the files by partition thereby further avoiding small file processing. The merge files 425 are then hashed to redistribute them to the plurality of works as merge files 430 (e.g., MergeExternalFiles_7, arrow files). In the example of FIG. 4 for clarity of the illustration, only a single worker node 405 is illustrated, but it is appreciated that the merge files 430 are likewise redistributed to the other nodes using the hashing by the partition key. Each of the merge files 430 can further undergo an upper projection (e.g., to eliminate extra columns of output) to generate the final result files (e.g., result file 435, a 500 MB parquet file), which are then exported to the external data lake in complete structured and partitioned form according to the single export request generated by the user.

Figure 5:
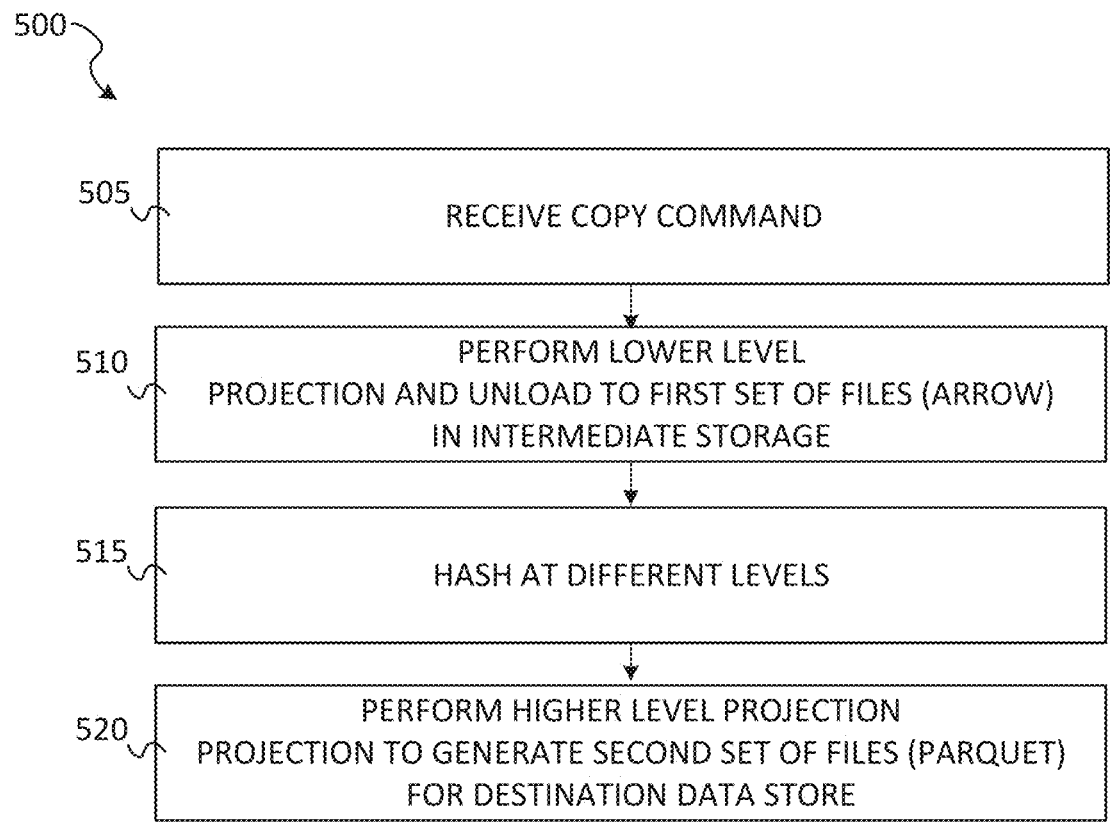
FIGS. 5-7 show example flow diagrams for performing multistage exports, according to some example embodiments.

FIG. 5 shows a flow diagram of an example method 500 for exporting data into different folders using a multistage database export system, according to some example embodiments. At operation 505, the multistage export system 225 receives an export command. The export command can include a partitioned-by parameter option to set how the files will be structured at the destination (e.g., timestamp based, geographic data based, based on one or more specified columns or types of columns of the tables, etc.). Further, the export command can include the file type of the final files to be exported (e.g., Parquet, CSV, JSON) and the max file size per partition (e.g., 500 MB). An example of the command syntax is included below, with explanatory comments denoted by forward slashes ("//"):

::::::::::::::::::::CODE BEGIN::::::::::::::::::::
COPY INTO {internalStage|externalStage|externalLocation}
//specifies internal stage, external stage, and eternal location (data lake)
FROM {[<namespace>.]<table_name>|(<query>)}
//specifies file name structure and query parameters to identify specific data from tables to multistage export
[PARTITION BY <partition_expression>]
//specifies the structure by which the result files are partitioned or separated to different folders directories. E.g., by time, by geographic location, by specific columns, etc. <partition_expression> is an expression that can reference columns (via aliases from the select list of the query). When evaluated, it produces a string value—a prefix that is used to hold all files containing data belonging to the specified partition.
[FILE_FORMAT=({FORMAT_NAME='[<namespace>.]<file_format_name>'|TYPE={CSV|JSON|PARQUET} [formatTypeOptions]})
//specifies result file type, and options such as Max file size
::::::::::::::::::::CODE END::::::::::::::::::::

At operation 510, the plurality of nodes perform lower level projection and unload, as discussed above with reference to FIG. 4. At operation 515, the export data is merged at different levels of the export architecture, as discussed in further detail below with reference to FIG. 6. At operation 520, the plurality of nodes perform high level projection operations after merging (e.g., merge files 430, discussed above) to generate the result files as specified per the received command of operation 505 (e.g., in the specified format such as Parquet, each result file having a max size per the command).

Figure 6:
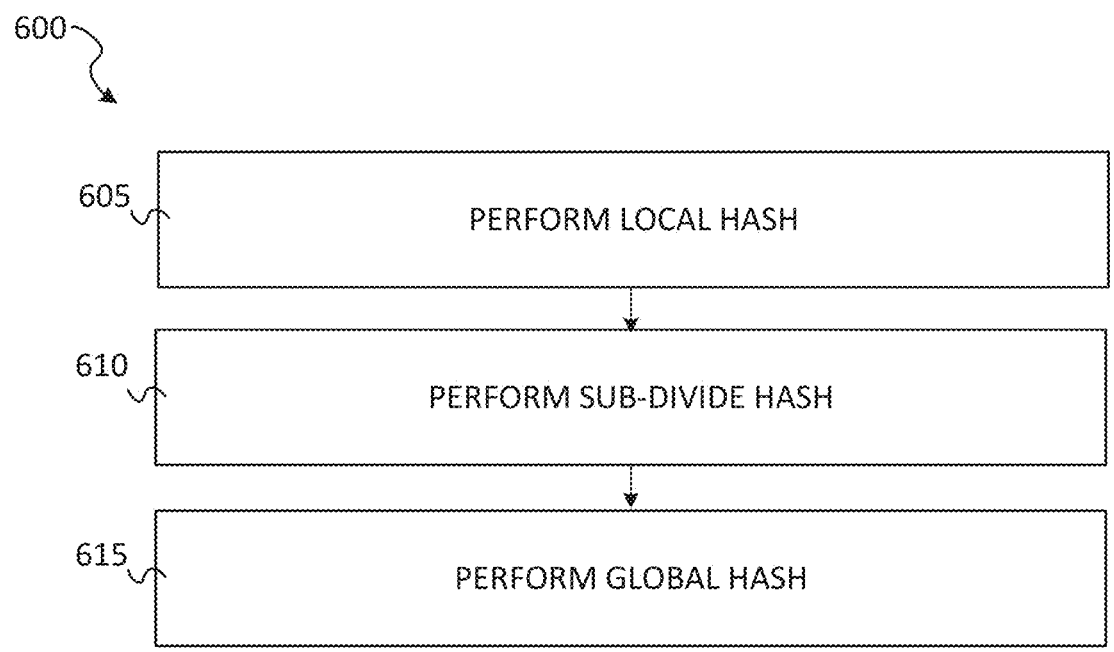

FIG. 6 shows a flow diagram of a method 600 for performing hashes to combine data in the export process, according to some example embodiments. At operation 605, local hashes are performed by each of the plurality of nodes. For example, with reference to worker node 405, each of the threads of the worker node 405 (e.g., thread 410A, 410N) can generate merge files 415, which are merged internally across all threads by locally hashing within the worker node 405 at operation 605. At the same time (e.g., concurrently, in parallel), the other nodes (e.g., node 450, etc.) can perform the local internal hashing in a similar manner at operation 605, thereby generating merge file sets, each of which are hashed within a respective node to combine the data per the request (e.g., by partition key).

At operation 610, the multistage export system 225 performs subdivide hashing across the datasets generated by each of the nodes. For example, the merge files 420 generated by each of the nodes is stored in an internal staging datastore (e.g., database 116) and the multistage export system 225 merges the data across the plurality of nodes to combine data into similar partitions to generate merge files 430.

At operation 615, the multistage export system 225 performs further hashing to combine the data into similar partitions. For example, the multistage export system 225 hashes merge files 425 to create merge files 430 which are then distributed from the staging area to the plurality of nodes for upper projection processing to generate the result files in the specified result file format (e.g., Parquet, JSON) and max file size (e.g., 500 MB).

Figure 7:
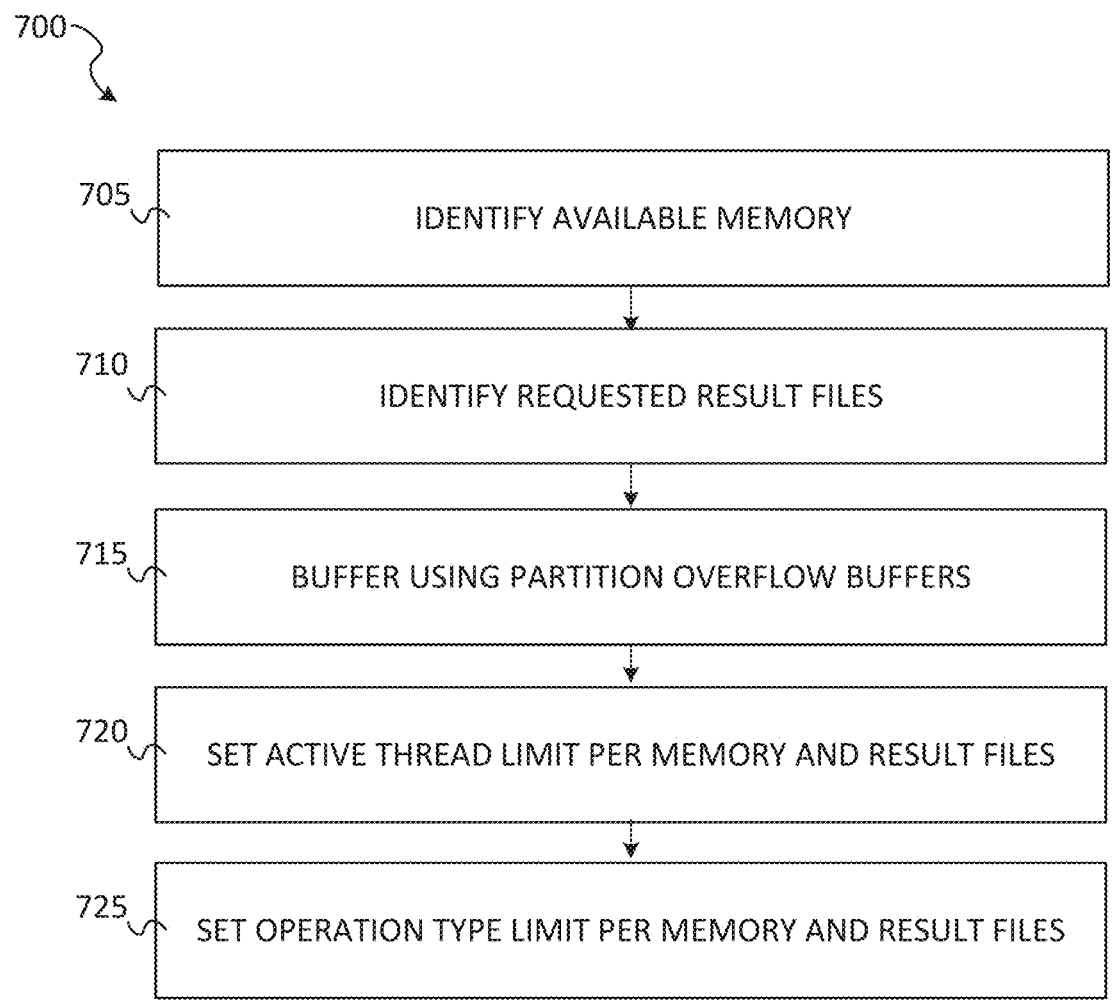

FIG. 7 shows a flow diagram of a method 700 for efficiently generating export data for partitions using a multistage export and a plurality of nodes, according to some example embodiments. Due to memory of the given nodes being of finite size, based on the size of the result files requested, the multistage export system 225 can adjust the operational flow of the multistage architecture to avoid out-of-memory issues. For example, if a given export requests specifies 500 MB Parquet files (compressed), the data of each file uncompressed can be two to three gigabytes in size which can slow down a given node (e.g., a single worker node producing 3 parquet files on 3 different threads may consume significant amounts of memory). To avoid these issues, the multistage export system 225 can implement query plan export optimization of method 700.

At operation 705, the available memory is identified. For example, the memory allocated to a given node is identified, where the available memory for the node is split for use by the nodes' threads. At operation 710, the requested result type and file size is identified.

At operation 715, the data processed by threads (e.g., threads 410A-410N) is buffered using a partitioned overflow buffer (e.g., each thread has a partitioned overflow buffer which includes N overflow buffers). Rows will be distributed to individual Overflow Buffers by hashing on the Partition Key. Partitioned Overflow Buffer of a given thread will track the number of partitions P that are present in the individual Overflow Buffers, as well as the number of rows associated with each partition P. When an Overflow Buffer instance is full, the multistage export system 225 determines the number of partitions K to be processed from the Overflow Buffer. The system 225 flushes the K largest active unloaders (based upon their estimated file size) and process the K partitions from the Overflow Buffer. If the Overflow Buffer contains more partitions than can be concurrently supported, the multistage export system 225 iterates for further processing.

Thread barrier processing of overflow buffers: In some example embodiments, once all rows have been received by the Partitioned Unload process, each thread will have a Partitioned Overflow Buffer containing N Overflow Buffers to process. Rather than each thread separately processing their Partitioned Overflow Buffer and thus of their N Overflow Buffers, the multistage export system 225 instead adds a barrier stop and has each thread process the same Overflow Buffer from all of the threads. Thus thread-J will process the Overflow Buffer[J] from all of the threads. Because the multistage export system 225 distributed the rows into each Overflow Buffer based upon their partition key (e.g., the same partition files go into the same overflow buffer for each thread), which allows the processing to aggregate the partition data across all threads before unloading it to remote storage, thereby combining more data to create bigger result files and a smaller number of overall files, due to the processing of the overflow buffer for one through N at the same time. In other words, since one instance is processing the same overflow buffer J from all the threads, the instance effectively merges the partition-specific rows from across the threads into files (e.g., arrow files) before it is uploaded. So if upon termination of all the threads' collective overflow buffers having only 5 MB of data for a partition P, the instance only generates 1 arrow file for partition P, rather than N (assuming all threads have at least 1 row for partition P) smaller arrow files. In this way, the number of files for output to network storage is reduced which reduces the network overhead and contention.

At operation 720, the multistage export system 225 sets a limit on the number of threads within a node that can implemented for export processing based on the received query (e.g., available memory, node quantity, and/or requested file sizes of the result files). For example, if there are 12 GB of memory in a node, which is to be divided across the multiple threads, each is assigned 1.5 GB of memory total. Increasing the requested file in turn increases the row group size that is inside of the file, which increases the amount of memory actually needed to write the file. In the case where the required memory exceeds the available memory (e.g., the parquet file size requested requires a thread to use more than 1.5 GB of memory), then the multistage export system 225 sets a limit to the active threads running simultaneously to ensure the machine does not run out of memory. For example, if eight threads are available, based on the available memory and the requested files, the multistage export system 225 can set only four threads as active to produce the parquet files, while keeping the other four threads of the node idle to avoid memory issues. In some example embodiments, in setting the active threads of a node, the number of threads is not changed but rather the number of threads that receive data inputs for processing is changed, thereby changing the number of threads that have export processes to complete (e.g., while other threads that do not receive input data remain idle, with respect to export processes per the export request).

At operation 725, the multistage export system 225 limits the operations implemented by threads and/or nodes based on the available memory and requested result files. In some example embodiments, each thread inside a node runs independent and separate from the other nodes (e.g., concurrently, in parallel). Thus, it can sometimes be the case that during a given multistage export operation, one thread is performing a partition unload operation and two other threads in the node are performing merges. To avoid bottlenecks of memory, the multistage export system 225 can limit, on an operation-type level, how many threads can perform a given operation. For example, and in accordance with some example embodiments, the multistage export system 225 can implement the query execution by the threads in a barrier stop manner, in which the threads must complete a given set of operations (e.g., partition unloads) before any one of the threads performs another type of operations (e.g., merge and generation of files). In some example embodiments, the operational limit can be modified further based on the requested file type. For example, if large parquet files are to be generated, then the multistage export system 225 can set a limit that all threads must complete projection and partition unloads before any one of the nodes can generate a parquet file via merging. In contrast, if small result files are to be produced (e.g., small parquet files), the multistage export system 225 can set a limit that only a maximum of two threads can generate result files at any one time.

In some example embodiments, the threads are configured as task specific worker threads, e.g., unload nodes to perform partition unload operations, merge threads to perform merging operations, projection threads to perform projections, and so on. In those example embodiments, the barrier stop per operation approach can be implemented by not inputting data to nodes of a given type, thereby keeping the threads of that type idle. For example, at operation 725, the export system 225 can implement the multiple threads such that only unload threads are active and while any unload threads are active, no merge threads such be active. To this end, the system 225 does not send any input to the merge thread, and thus the merge thread has no work to process and thereby remains idle (e.g., not consuming memory).

Further, in some example embodiments, all threads within node are dedicated to a specific task (e.g., merging tasks) and the node is thereby a merge node, and other nodes can likewise be dedicated to other tasks (e.g., unload node with all unload threads). In some example embodiments, to conserve memory the system 225 can barrier stop the operations at the node level, e.g., ensuring that only unload nodes are operating, and no merge node is activated until all unload nodes complete processes (e.g., by not sending data to a merge node).

Figure 8:
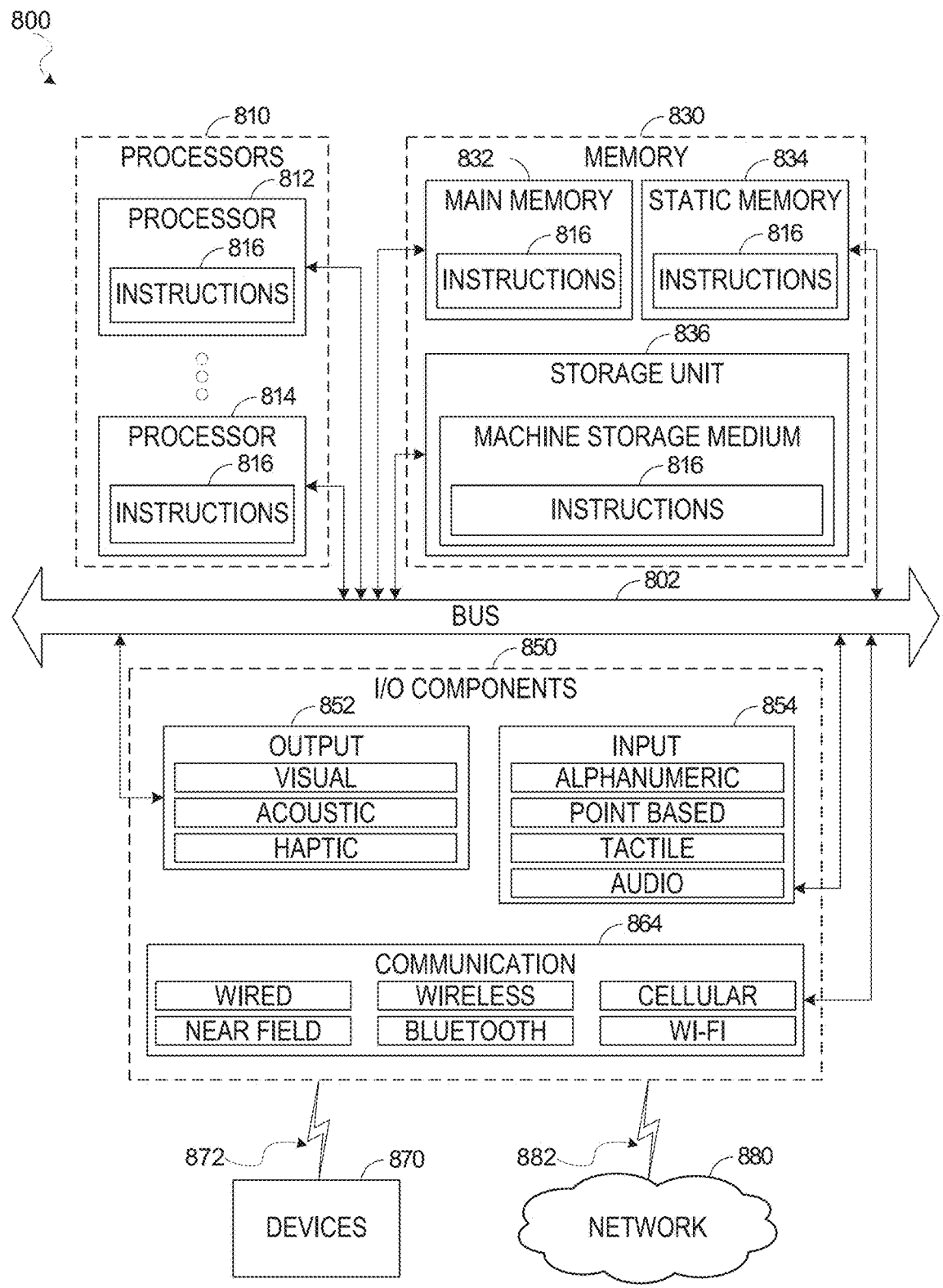
FIG. 8 illustrates a diagrammatic representation of a machine in the form of a computer system within which a set of instructions may be executed for causing the machine to perform any one or more of the methodologies discussed herein, in accordance with some embodiments of the present disclosure.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute any one or more operations of any one or more of the methods 500, 600, or 700. As another example, the instructions 816 may cause the machine 800 to implement portions of the data flows illustrated in any one or more of FIGS. 1-4. In this way, the instructions 816 transform a general, non-programmed machine into a particular machine 800 (e.g., the remote computing device 106, the access management system 110, the compute service manager 112, the execution platform 114, the access management system 118, the Web proxy 120, remote computing device 106) that is specially configured to carry out any one of the described and illustrated functions in the manner described herein.

In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 includes processors 810, memory 830, and input/output (I/O) components 850 configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors 810 that may comprise two or more independent processors (sometimes referred to as "cores") that may execute instructions 816 contemporaneously. Although FIG. 8 shows multiple processors 810, the machine 800 may include a single processor with a single core, a single processor with multiple cores (e.g., a multi-core processor), multiple processors with a single core, multiple processors with multiple cores, or any combination thereof.

The memory 830 may include a main memory 832, a static memory 834, and a storage unit 836, all accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 include components to receive input, provide output, produce output, transmit information, exchange information, capture measurements, and so on. The specific I/O components 850 that are included in a particular machine 800 will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, and other communication components to provide communication via other modalities. The devices 870 may be another machine or any of a wide variety of peripheral devices (e.g., a peripheral device coupled via a universal serial bus (USB)). For example, as noted above, the machine 800 may correspond to any one of the remote computing device 106, the access management system 110, the compute service manager 112, the execution platform 114, the access management system 118, the Web proxy 120, and the devices 870 may include any other of these systems and devices.

The various memories (e.g., 830, 832, 834, and/or memory of the processor(s) 810 and/or the storage unit 836) may store one or more sets of instructions 816 and data structures (e.g., software) embodying or utilized by any one or more of the methodologies or functions described herein. These instructions 816, when executed by the processor(s) 810, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods 500, 600, and 700 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

The following numbered examples are embodiments:

Example 1. A method comprising: receiving, by one or more processors, an export request to export data from tables of a database to an external datastore, the export request comprising a partition key for partitioning the data across a plurality of partitions in the external datastore, portions of the data being distributed to each of a plurality of nodes of the database for processing; generating, by the plurality of nodes, first merge files by querying the tables, in parallel, according to the partition key, each node querying a corresponding portion of the data using the partition key to generate one of the first merge files; generating second merge files by hashing the first merge files using the partition key, the second merge files being merged according to the partition key, portions of the second merge files stored across the plurality of nodes for processing; and generating, by the plurality of nodes, result files in a format specified in the export request, each node querying a corresponding portion of merged data in the second merge files to generate one of the result files in the format specified in the export request.

Example 2. The method of example 1, wherein the data is distributed to each of the plurality of nodes for parallel processing, and wherein the first merge files are stored in a staging location in the database.

Example 3. The method of any of examples 1 or 2, wherein each node processes a corresponding portion of the data distributed to the node using a plurality of threads.

Example 4. The method of any of examples 1-3, wherein each thread performs a table scan on the data of the node followed by a projection operation and a partition unload operation to generate initial merge files.

Example 5. The method of any of examples 1-4, further comprising, for each node, performing a local hash within each node to generate one or more of the first merge files.

Example 6. The method of any of examples 1-5, wherein each node performs the projection operation on a corresponding portion of the second merge files to generate one of the result files.

Example 7. The method of any of examples 1-6, wherein the export request includes a maximum file size for each of the result files to be created at the external datastore.

Example 8. The method of any of examples 1-7, wherein some of the plurality of nodes generate small files that are combined by merging using hashing to generate result files of the maximum file size.

Example 9. The method of any of examples 1-8, wherein the first merge files are in a temporary serializable format for merging by hashing.

Example 10. The method of any of examples 1-9, wherein the temporary serializable format is arrow file format, and wherein the format of the result files is a non-arrow format.

Example 11. The method of any of examples 1-10, wherein the non-arrow format is comma separated value (CSV) format.

Example 12. A system comprising: one or more processors of a machine; and a memory storing instructions that, when executed by the one or more processors, cause the machine to perform operations comprising: receiving an export request to export data from tables of a database to an external datastore, the export request comprising a partition key for partitioning the data across a plurality of partitions in the external datastore that is external to the database, portions of the data being distributed to each of a plurality of nodes of the database for processing; generating, by the plurality of nodes, first merge files by querying the tables, in parallel, according to the partition key, each node querying a corresponding portion of the data using the partition key to generate one of the first merge files, the first merge files stored in a staging location in the database; generating second merge files by hashing the first merge files using the partition key, the second merge files being merged according to the partition key, portions of the second merge files stored across the plurality of nodes for processing; and generating, by the plurality of nodes, result files in a format specified in the export request, each node querying a corresponding portion of merged data in the second merge files to generate one of the result files in the format specified in the export request.

Example 13. The system of example 12, wherein the data is distributed to each of the plurality of nodes for parallel processing.

Example 14. The system of any of examples 12 or 13, wherein each node processes a corresponding portion of the data distributed to the node using a plurality of threads.

Example 15. The system of any of examples 12-14, wherein each thread performs a table scan on the data of the node followed by a projection operation and a partition unload operation to generate initial merge files.

Example 16. The system of any of examples 12-15, further comprising, for each node, performing a local hash within each node to generate one or more of the first merge files.

Example 17. The system of any of examples 12-16, wherein each node performs the projection operation on a corresponding portion of the second merge files to generate one of the result files.

Example 18. The system of any of examples 12-17, wherein the export request includes a maximum file size for each of the result files to be created at the external datastore.

Example 19. The system of any of examples 12-18, wherein some of the plurality of nodes generate small files that are combined by merging using hashing to generate result files of the maximum file size.

Example 20. The system of any of examples 12-19, wherein the first merge files are in a temporary serializable format for merging by hashing.

Example 21. The system of any of examples 12-21, wherein the temporary serializable format is arrow file format, and wherein the format of the result files is a non-arrow format.

Example 22. The system of any of examples 12-21, wherein the non-arrow format is comma separated value (CSV) format.

Example 23. A computer-storage medium embodying instructions that, when executed by a machine, cause the machine to perform operations comprising: receiving an export request to export data from tables of a database to an external datastore, the export request comprising a partition key for partitioning the data across a plurality of partitions in the external datastore that is external to the database, portions of the data being distributed to each of a plurality of nodes of the database for processing; generating, by the plurality of nodes, first merge files by querying the tables, in parallel, according to the partition key, each node querying a corresponding portion of the data using the partition key to generate one of the first merge files, the first merge files stored in a staging location in the database; generating second merge files by hashing the first merge files using the partition key, the second merge files being merged according to the partition key, portions of the second merge files stored across the plurality of nodes for processing; and generating, by the plurality of nodes, result files in a format specified in the export request, each node querying a corresponding portion of merged data in the second merge files to generate one of the result files in the format specified in the export request.

Example 24. The computer-storage medium of example 23, wherein the data is distributed to each of the plurality of nodes for parallel processing.

Example 25. The computer-storage medium of any of examples 23 or 24, wherein each node processes a corresponding portion of the data distributed to the node using a plurality of threads.

Example 26. The computer-storage medium of any of examples 23-25, wherein each thread performs a table scan on the data of the node followed by a projection operation and a partition unload operation to generate initial merge files.

Example 27. The computer-storage medium of any of examples 23-26, further comprising, for each node, performing a local hash within each node to generate one or more of the first merge files.

Example 28. The computer-storage medium of any of examples 23-27, wherein each node performs the projection operation on a corresponding portion of the second merge files to generate one of the result files.

Example 29. The computer-storage medium of any of examples 23-28, wherein the export request includes a maximum file size for each of the result files to be created at the external datastore.

Example 30. The computer-storage medium of any of examples 23-29, wherein some of the plurality of nodes generate small files that are combined by merging using hashing to generate result files of the maximum file size.

Example 31. A method comprising: receiving, by one or more processors, an export request to export data from a database to an external datastore in result files having a file size limit, portions of the data being distributed to each of a plurality of nodes of the database for processing by threads within each node; activating a subset of threads for one or more of the plurality of nodes to export the data based on the file size limit specified in the export request; generating, by the subset of threads within each node, first merge files by querying a corresponding portion of the data distributed to the node to generate one of the first merge files; generating, by the subset of threads within each node, second merge files by hashing the first merge files using a partition key specified in the export request; generating, by the subset of threads within each node, result files by each node querying a corresponding portion of merged data in the second merge files to generate one of the result files; and storing the result files in the external datastore.

Example 32. The method of example 31, wherein threads not included in the subset of threads activated based on the file size limit are idle during exporting of the data to the external datastore.

Example 33. The method of any of example 31 or 32, wherein only the subset of the threads are activated based on a finite amount of memory in each node, wherein each thread uses a portion of memory to perform export processing, and wherein a total quantity of portions of each thread being activated to generate result files of the file size limit specified in the export request exceeds the finite amount of memory in the node.

Example 34. The method of any of examples 31-33, further comprising: receiving, by one or more processors, an additional export request to export other data from the database to an additional external datastore in result file sizes having a smaller file size limit that is smaller than the file size limit of the data exported to the external datastore.

Example 35. The method of any of examples 31-34, further comprising: in response to receiving the additional export request, activating a larger subset of threads for one or more of the plurality of nodes to export the other data based on the smaller file size limit specified in the additional export request being smaller than the file size limit.

Example 36. The method of any of examples 31-35, wherein the larger subset of threads includes one or more threads not included in subset of threads activated in response to the file size limit in the export request.

Example 37. The method of any of examples 31-36, wherein the data is distributed to each of the plurality of nodes for parallel processing, and wherein the first merge files are stored in a staging location in the database.

Example 38. The method of any of examples 31-37, wherein each thread in the subset performs a table scan on the data of a corresponding node followed by a projection operation and a partition unload operation to generate initial merge files.

Example 39. The method of any of examples 31-38, further comprising, for each node, performing a local hash within each node across the subset of threads to generate one or more of the first merge files.

Example 40. The method of any of examples 31-39, wherein each node performs the projection operation on a corresponding portion of the second merge files to generate one of the result files.

Example 41. The method of any of examples 31-40, wherein some of the plurality of nodes generate, using the subset of threads, small files that are combined by merging using hashing to generate result files of the file size limit included in the export request.

Example 42. The method of any of examples 31-41, wherein the first merge files are in a temporary serializable format for merging by hashing.

Example 43. The method of any of examples 31-42, wherein the temporary serializable format is arrow file format, and wherein a format of the result files is a non-arrow format.

Example 44. A system comprising: one or more processors; and one or more memories storing instructions that, when executed by the one or more processors, cause the one or more processors to perform operations comprising: receiving an export request to export data from a database to an external datastore in result files having a file size limit, portions of the data being distributed to each of a plurality of nodes of the database for processing by threads within each node; activating a subset of threads for one or more of the plurality of nodes to export the data based on the file size limit specified in the export request; generating, by the subset of threads within each node, first merge files by querying a corresponding portion of the data distributed to the node to generate one of the first merge files; generating, by the subset of threads within each node, second merge files by hashing the first merge files using a partition key specified in the export request; generating, by the subset of threads within each node, result files by each node querying a corresponding portion of merged data in the second merge files to generate one of the result files; and storing the result files in the external datastore.

Example 45. The system of example 44, wherein threads not included in the subset of threads activated based on the file size limit are idle during exporting of the data to the external datastore, wherein only the subset of the threads are activated based on a finite amount of memory in each node, wherein each thread uses a portion of memory to perform export processing, and wherein a total quantity of portions of each thread being activated to generate result files of the file size limit specified in the export request exceeds the finite amount of memory in the node.

Example 46. The system of any of examples 44 and 45, further comprising: receiving, by one or more processors, an additional export request to export other data from the database to an additional external datastore in result file sizes having a smaller file size limit that is smaller than the file size limit of the data exported to the external datastore.

Example 47. The system of any of examples 44-46, further comprising: in response to receiving the additional export request, activating a larger subset of threads for one or more of the plurality of nodes to export the other data based on the smaller file size limit specified in the additional export request being smaller than the file size limit.

Example 48. The system of any of examples 44-47, wherein the larger subset of threads includes one or more threads not included in subset of threads activated in response to the file size limit in the export request.

Example 49. The system of any of examples 44-48, wherein the data is distributed to each of the plurality of nodes for parallel processing, and wherein the first merge files are stored in a staging location in the database.

Example 50. The system of any of examples 44-49, wherein each thread in the subset performs a table scan on the data of a corresponding node followed by a projection operation and a partition unload operation to generate initial merge files.

Example 51. The system of any of examples 44-50, further comprising, for each node, performing a local hash within each node across the subset of threads to generate one or more of the first merge files.

Example 52. The system of any of examples 44-51, wherein each node performs the projection operation on a corresponding portion of the second merge files to generate one of the result files.

Example 53. The system of any of examples 44-52, wherein some of the plurality of nodes generate, using the subset of threads, small files that are combined by merging using hashing to generate result files of the file size limit included in the export request.

Example 54. The system of any of examples 44-53, wherein the first merge files are in a temporary serializable format for merging by hashing.

Example 55. The system of any of examples 44-54, wherein the temporary serializable format is arrow file format, and wherein a format of the result files is a non-arrow format.

Example 56. A non-transitory computer-storage medium embodying instructions that, when executed by a machine, cause the machine to perform operations comprising: receiving an export request to export data from a database to an external datastore in result files having a file size limit, portions of the data being distributed to each of a plurality of nodes of the database for processing by threads within each node; activating a subset of threads for one or more of the plurality of nodes to export the data based on the file size limit specified in the export request; generating, by the subset of threads within each node, first merge files by querying a corresponding portion of the data distributed to the node to generate one of the first merge files; generating, by the subset of threads within each node, second merge files by hashing the first merge files using a partition key specified in the export request; generating, by the subset of threads within each node, result files by each node querying a corresponding portion of merged data in the second merge files to generate one of the result files; and storing the result files in the external datastore.

Example 57. The non-transitory computer-storage medium of example 56, wherein threads not included in the subset of threads activated based on the file size limit are idle during exporting of the data to the external datastore, wherein only the subset of the threads are activated based on a finite amount of memory in each node, wherein each thread uses a portion of memory to perform export processing, and wherein a total quantity of portions of each thread being activated to generate result files of the file size limit specified in the export request exceeds the finite amount of memory in the node.

Example 58. The non-transitory computer-storage medium of any of examples 56-57, further comprising: receiving, by one or more processors, an additional export request to export other data from the database to an additional external datastore in result file sizes having a smaller file size limit that is smaller than the file size limit of the data exported to the external datastore.

Example 59. The non-transitory computer-storage medium of any of examples 56-58, further comprising: in response to receiving the additional export request, activating a larger subset of threads for one or more of the plurality of nodes to export the other data based on the smaller file size limit specified in the additional export request being smaller than the file size limit.

Example 60. The non-transitory computer-storage medium of any of examples 56-59, wherein the larger subset of threads includes one or more threads not included in subset of threads activated in response to the file size limit in the export request.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A method comprising:
receiving, by one or more processors, an export request to export data from tables of a database to an external datastore, the export request comprising a partition key for partitioning the data across a plurality of partitions in the external datastore and further comprising an export file size for each result files of the export data to be exported to the plurality of partitions in the external datastore, portions of the data being distributed to each of a plurality of nodes of the database for processing;
generating, by the plurality of nodes, first merge files by querying the tables according to the partition key, each node generating a plurality of threads to process a corresponding portion of the data assigned to the node, each node further performing a local hash within the node by using the partition key to merge data generated by each of the threads to generate one or more of the first merge files, the first merge files comprising smaller files that are smaller than the export file size, the smaller files being generated based on the partition key and the export file size specified in the export request;

unloading the first merge files from the plurality of nodes to a staging datastore that is external to the plurality of nodes;

generating, in the staging datastore that is external to the plurality of nodes, second merge files by externally hashing the first merge files using the partition key to merge the smaller files into larger files of the second merge files;

distributing the second merge files to the plurality of nodes for processing; and generating, by the plurality of nodes, result files in a format specified in the export request, the result files being partitioned according to the partition key and sized according to the export file size specified in the export request, each node querying a corresponding portion of merged data in the second merge files to generate one of the result files in the format specified in the export request.

2. The method of claim 1, wherein each thread performs a table scan on the export data processed by the thread.

3. The method of claim 2, wherein each thread performs a projection operation on the export data generated from the table scan and a partition unload operation to generate initial merge files.

4. The method of claim 2, wherein each node performs the projection operation on a corresponding portion of the second merge files to generate one of the result files.

5. The method of claim 1, wherein the first merge files are in a temporary serializable format for merging by hashing.

6. The method of claim 5, wherein the temporary serializable format is arrow file format, and wherein the format of the result files is a non-arrow format.

7. The method of claim 6, wherein the non-arrow format is comma separated value (CSV) format.

8. A system comprising:
one or more processors of a machine; and
a memory storing instructions that, when executed by the one or more processors, cause the machine to perform operations comprising:
receiving an export request to export data from tables of a database to an external datastore, the export request comprising a partition key for partitioning the data across a plurality of partitions in the external datastore that is external to the database and further com-rising an export file size for each result files of the export data to be exported to the plurality of partitions in the external datastore, portions of the data being distributed to each of a plurality of nodes of the database for processing;

generating, by the plurality of nodes, first merge files by querying the tables according to the partition key, each node generating a plurality of threads to process a corresponding portion of the data assigned to the node, each node further performing a local hash within the node by using the partition key to merge data generated by each of the threads to generate one or more of the first merge files, the first merge files stored in a staging location in the database, the first merge files comprising smaller files that are smaller than the export file size, the smaller files being generated based on the partition key and the export file size specified in the export request;

unloading the first merge files from the plurality of nodes to a staging datastore that is external to the plurality of nodes;

generating, in the staging datastore that is external to the plurality of nodes, second merge files by externally hashing the first merge files using the partition key to merge the smaller files into larger files of the second merge files;

distributing the second merge files to the plurality of nodes for processing; and generating, by the plurality of nodes, result files in a format specified in the export request, the result files being partitioned according to the partition key and sized according to the export file size specified in the export request, each node querying a corresponding portion of merged data in the second merge files to generate one of the result files in the format specified in the export request.

9. The system of claim 8, wherein each thread performs a table scan on the export data processed by the thread.

10. The system of claim 9, wherein each thread performs a projection operation on the export data generated from the table scan and a partition unload operation to generate initial merge files.

11. The system of claim 10, wherein each node performs the projection operation on a corresponding portion of the second merge files to generate one of the result files.

12. The system of claim 8, wherein the first merge files are in a temporary serializable format for merging by hashing.

13. The system of claim 12, wherein the temporary serializable format is arrow file format, and wherein the format of the result files is a non-arrow format.

14. The system of claim 13, wherein the non-arrow format is comma separated value (CSV) format.

15. A non-transitory computer-storage medium embodying instructions that, when executed by a machine, cause the machine to perform operations comprising:
receiving an export request to export data from tables of a database to an external datastore, the export request comprising a partition key for partitioning the data across a plurality of partitions in the external datastore that is external to the database and further com-rising an export file size for each result files of the export data to be exported to the plurality of partitions in the external datastore, portions of the data being distributed to each of a plurality of nodes of the database for processing;

generating, by the plurality of nodes, first merge files by querying the tables according to the partition key, each node generating a plurality of threads to process a corresponding portion of the data assigned to the node, each node further performing a local hash within the node by using the partition key to merge data generated by each of the threads to generate one or more of the first merge files, the first merge files comprising smaller files that are smaller than the export file size, the smaller files being generated based on the partition key and the export file size specified in the export request;

unloading the first merge files from the plurality of nodes to a staging datastore that is external to the plurality of nodes;

generating, in the staging datastore that is external to the plurality of nodes, second merge files by externally hashing the first merge files using the partition key to merge the smaller files into larger files of the second merge files;

distributing the second merge files to the plurality of nodes for processing; and generating, by the plurality of nodes, result files in a format specified in the export request, the result files being partitioned according to the partition key and sized according to the export file size specified in the export request, each node querying a corresponding portion of merged data in the second merge files to generate one of the result files in the format specified in the export request.

16. The non-transitory computer-storage medium of claim 15, wherein each thread performs a table scan on the export data processed by the thread.

17. The non-transitory computer-storage medium of claim 16, wherein each thread performs a projection operation on the export data generated from the table scan and a partition unload operation to generate initial merge files.

18. The non-transitory computer-storage medium of claim 17, wherein each node performs the projection operation on a corresponding portion of the second merge files to generate one of the result files.

\* \* \* \* \*

UNITED STATES PATENT AND TRADEMARK OFFICE
CERTIFICATE OF CORRECTION

PATENT NO. : 11,138,232 B1  
APPLICATION NO. : 17/086215  
DATED : October 5, 2021  
INVENTOR(S) : Paraschiv et al.

Page 1 of 1

It is certified that error appears in the above-identified patent and that said Letters Patent is hereby corrected as shown below:

On the Title Page

On page 2, in Column 1, Item (56) under "U.S. Patent Documents", Line 9, delete "2020/0008971" and insert --2020/0089710-- therefor In the Claims In Column 25, Line 33, in Claim 4, delete "claim 2," and insert --claim 3,-- therefor In Column 25, Line 52, in Claim 8, delete "com-rising" and insert --comprising-- therefor In Column 26, Line 46, in Claim 15, delete "com-rising" and insert --comprising-- therefor Signed and Sealed this  
Fourth Day of January, 2022

Drew Hirshfeld  
*Performing the Functions and Duties of the*  
*Under Secretary of Commerce for Intellectual Property and*  
*Director of the United States Patent and Trademark Office*